United States Patent [19]

Hans et al.

[11] Patent Number: 5,690,433

[45] Date of Patent: Nov. 25, 1997

[54] SYSTEM FOR PRELOADING THE BEARING OF A PUMP ASSEMBLY

[75] Inventors: Rüdiger Hans, Niederwerrn; Elmar Mause, Schweinfurt, both of Germany

[73] Assignee: SKF GmbH, Germany

[21] Appl. No.: 609,717

[22] Filed: Mar. 1, 1996

[30] Foreign Application Priority Data

Mar. 9, 1995 [DE] Germany ............... 195 08 404.7

[51] Int. Cl.$^6$ ............... F16C 19/02; F16C 35/06; F04D 29/04; F04D 29/12

[52] U.S. Cl. ............... 384/482; 384/518

[58] Field of Search ............... 384/481, 482, 384/139, 517, 518

[56] References Cited

U.S. PATENT DOCUMENTS

| | | | |
|---|---|---|---|
| 3,938,864 | 2/1976 | Haussels | 384/482 |
| 4,054,335 | 10/1977 | Timmer | 384/482 |
| 4,545,692 | 10/1985 | Bras et al. | 384/482 |
| 4,603,983 | 8/1986 | Hofmann et al. | 384/517 |
| 5,017,024 | 5/1991 | Clark et al. | 384/482 |
| 5,538,259 | 7/1996 | Uhrner et al. | 384/481 |

FOREIGN PATENT DOCUMENTS

| | | | |
|---|---|---|---|
| 1072851 | 1/1960 | Germany | 384/139 |
| 74-14842 | 12/1974 | Germany. | |

*Primary Examiner*—Daniel P. Stodola
*Assistant Examiner*—Matthew A. Kaness
*Attorney, Agent, or Firm*—Eugene E. Renz, Jr.

[57] ABSTRACT

A system for preloading the bearing of a cooling water pump for motor vehicles. The pump comprises a shaft and an impeller mounted on one end of the shaft and, an outer bearing ring surrounding the shaft. An axial face seal is mounted on one projecting end of the shaft operable bearing ring and to tension spring-loaded sliding rings with a predetermined contact pressure against each other. The outer axial end face of the axial face seal is aligned with the axial end face of the shaft to simplify and insert the same preloading of the bearing for assemblies put together by mass production techniques.

5 Claims, 1 Drawing Sheet

SYSTEM FOR PRELOADING THE BEARING OF A PUMP ASSEMBLY

FIELD OF THE INVENTION

The present invention relates to improvements in bearing assemblies and more specifically to an improved bearing design for the impeller of a cooling water pump for motor vehicles.

BACKGROUND OF THE INVENTION

Cooling water pumps are known from the prior art. A typical assembly is shown in German Registered Design No. 74-14,842. This assembly includes an axial face seal for securing the bearing against the coolant circuit, the seal having two (2) relatively rotatable parts, one of the parts of the axial face seal attached to the outer ring of a water pump bearing and the second rotating part pushed onto a shaft and abutting an axial spring. In assembling these parts, the pressing on step must be done with very precise accuracy since the two parts must be positioned precisely with respect to one another. It has been found that deviations occur particularly in situations where these parts are mass produced and assembled which lead to significant variations in the axial contact pressure of the sealing parts. The result of this is that the seals can in some instances fail either by reason of too much wear or because of leakage.

SUMMARY OF THE INVENTION

With the above in mind, it is an object of the present invention to provide a bearing design of the above type which is characterized by novel features of construction and arrangement so that it is easy to fabricate by mass production techniques and wherein the starting pressure is generally the same for all of the assemblies. It is also an object of the present invention to provide an assembly wherein the parts can be assembled at low cost.

To this end, the shaft of the pump impeller is mounted in such a manner that it can rotate by means by two rows of ball bearings in an outer bearing ring. The shaft projects axially beyond the outer bearing ring on both sides so that an axial face seal for the pump impeller can be mounted on one projecting end. The non-rotating part of the face seal rests against the outer bearing ring and the rotating part of the face seal is attached to the shaft far enough away so that spring loaded sliding rings are tensioned with a defined predetermined contact pressure against one another. The other axial projection of the shaft on the impeller side has a predetermined length generally equal to the length of the axial face seal under its operating pretension and also includes an axial bore to hold the shaft journal carrying the pump impeller.

By this arrangement, the shaft side part of the axial face seal is always pressed on so that it is flush with the axial end of the shaft. Accordingly, it is necessary to have an exact measurement of the distance between this end surface and the contact surface of the part of the axial face seal in the outer ring side. This can be provided without any additional fabrication measures by machining the raceways for the balls into the shaft at a predetermined fixed distance from the end surface in question. The same procedure is followed with the outer ring. Thus, raceways are machined at a fixed distance from the contact surface for the part of the axial face seal on the outer ring side. Accordingly, the two parts of the seal are always in the same relative position. The axial bore is provided in the shaft for a shaft journal to ease mounting the pump impeller.

The novel features of the present invention provide a bearing design for a pump impeller of a cooling water pump for motor vehicles which can be produced inexpensively and it characterized by novel features of construction and arrangement so that it is easy to install. Additionally, the parts can be assembled with uniform accuracy and thus the assembly lends itself to mass production techniques. Further, the present invention facilitates a compact "bearing seal unit" which lends itself readily to a modular construction system and is adapted practically to any application simply by inserting the desired shaft journal and impeller.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
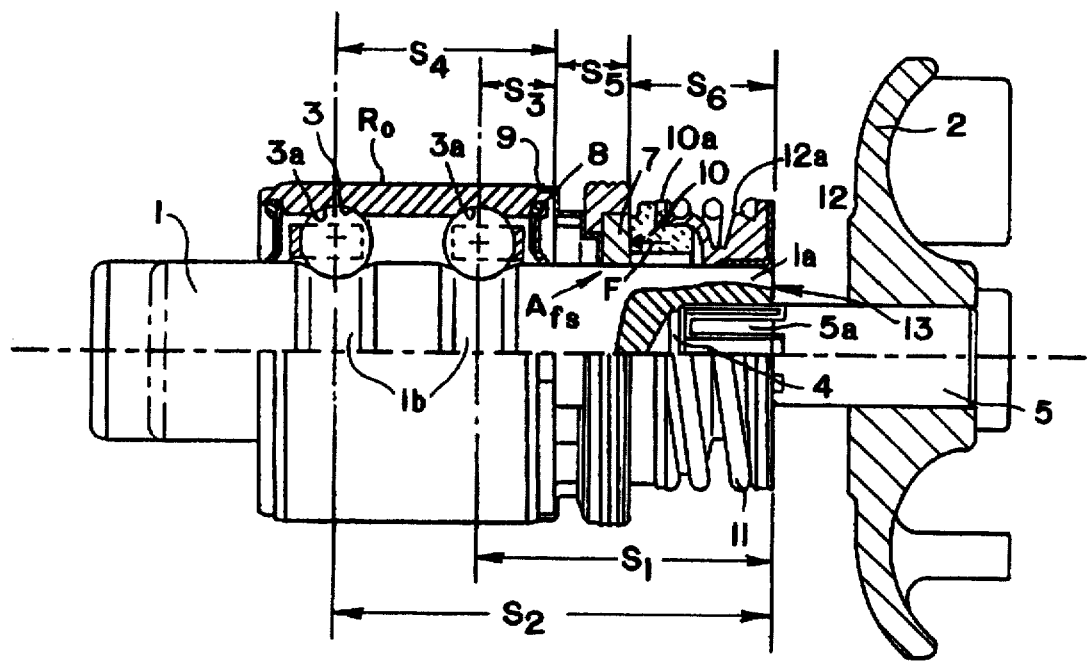
FIG. 1 is a partial longitudinal sectional view through a bearing assembly in accordance with the present invention particularly adapted for water pumps having a flush seal and a pressed in shaft journal.

Referring now to the drawings and particularly FIG. 1 thereof, there is shown a bearing assembly in accordance with the present invention particularly adapted for a cooling water pump for motor vehicles. The bearing assembly illustrated comprises a two row ball bearing. The assembly includes a shaft (1) which, in the present instance, is a solid shaft which mounts a pump impeller (2). One axial end portion ($1_a$) of the shaft (1) is provided with a blind hole (4) to receive a pressed in shaft journal (5) having a toothed profile ($5_a$). The impeller (2) is mounted on the outer axial end of the shaft journal (5). The impeller is rotatably mounted in the housing of the pump on a bearing assembly including an outer ring $R_o$ circumscribing the shaft and two rows of balls (3) which engage inner and outer raceways ($1_b$) and ($3_a$) formed in the shaft (1) and outer ring $R_o$ respectively.

An axial face seal $A_{fs}$ is mounted on the impeller side of the shaft on a shaft extension part ($1_a$) which extends beyond the outer end of the outer bearing ring $R_o$. The axial face seal $A_{fs}$, in the present instance, comprises a non-rotating sliding ring (7) attached to the end surface (8) of the outer ring $R_o$ by means of a sheet metal flanged supporting ring (9). The face seal $F_s$ further includes a rotatable sliding ring (10) pressed with a predetermined pretension against the non-rotating sliding ring (7) in the present instance by biasing means such as a coil spring (11). The coil spring (11) at its right hand end is supported by a flange ring (12) and associated spring guide $12_a$ mounted on the axial end of the shaft extension ($1_a$). Note that the flange ring (12) is flush with the axial end surface (13) of shaft (1). The shaft section ($1_a$) projecting beyond the axial end face of the outer ring (8) is dimensioned in such a way that it has the same length L as the axial face seal under its operating pretension.

For a better understanding of the present invention, various linear dimensions or distances of the components are fixed and have been identified in the drawings by the designations $S_1$–$S_6$ inclusive. Thus, the distance from the terminal end (13) of shaft portion ($1_a$) to the center line of the first bearing raceway ($1_b$) is a fixed constant distance. $S_2$ is the distance from the terminal end (13) of shaft portion ($1_a$) to the center line of the second bearing raceway ($1_b$) is likewise a fixed distance. $S_3$ is the distance from the outer terminal end of the outer bearing ring to the raceway center line of the first balls ($3_a$) is a fixed distance. $S_4$ which is the distance from the outer terminal end of the outer bearing ring $R_o$ to the raceway center line of the second raceway ($3_a$) is a fixed distance. $S_5$ is a fixed distance from the outer face of non-rotating seal (7) created in assembly of the above per fabricated parts. $S_6$ is the resulting pre-designed fixed distance from the outer face of non-rotating seal (7) to the terminal end (13) of shaft portion ($1_a$).

Summarizing mass production of assemblies in accordance with the present invention, the spring biased rotatable sliding ring (10) assembly, including the sliding rings (10), ($10_a$), spring guide ($12_a$), spring (11) and flange ring (12) are positioned on the shaft portion ($1_a$) so that the outer end wall of flange ring (12) is coplanar with the terminal end face (13) of the shaft portion ($1_a$). It is noted that in assembling these parts there is no adjustments or precise measurements involved. The compression of spring (11) is precalculated so that the desired contact force "F" between the non-rotating seal face (7) and the rotating ring (10) will be the same in each assembly when put together in the manner described above. The assembly is then completed by simply pressing the shaft journal (5) with associated impeller (2) into the blind hole (4).

Figure 2:
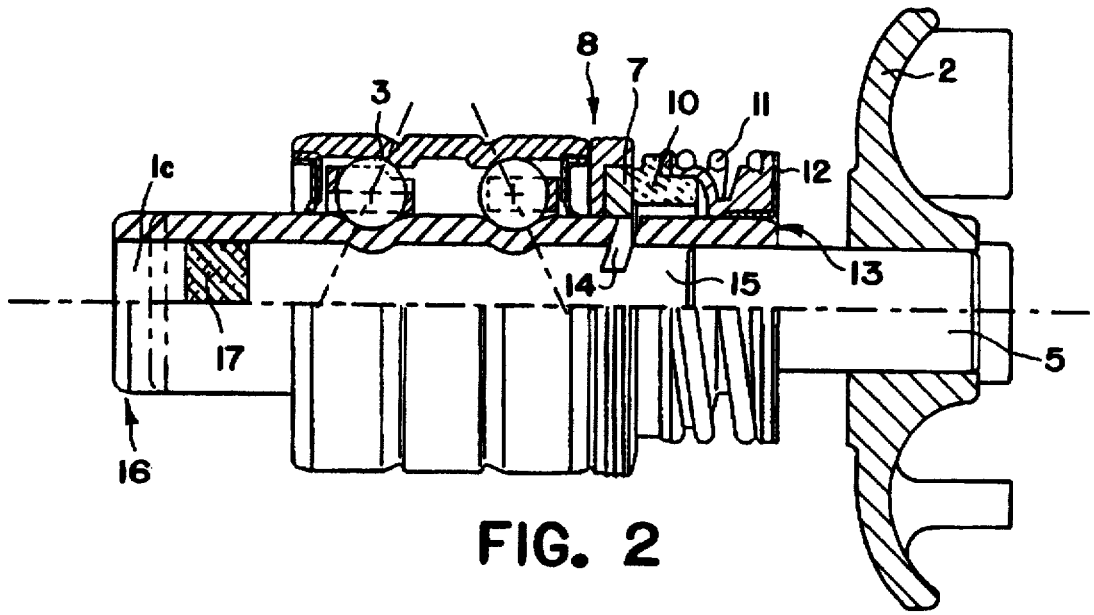
FIG. 2 is a partial longitudinal sectional view through the bearing assembly of the present invention having a modified version with a flush seal, a continuous axial bore and a condensate separator.

There is shown in FIG. 2 a modified face seal and bearing assembly in accordance with the present invention. Various of the elements are similar to those in the principal embodiment and therefore have been designated with the same reference numerals. However in the present instance, the shaft ($1_c$) is a hollow shaft having an axially extending through bore ($1_d$) and the shaft journal ($5_b$) is mounted in the bore ($1_d$) of the shaft ($1_c$) at one axial end and is bonded in place with a suitable adhesive.

An opening (14) leads from the sliding area of the axial face seal into bore ($1_d$) to carry away condensate which may form therein. Note that the opening is biased or slanted to improve the flow in the direction toward drive end (16) of shaft ($1_c$). A plug (17) of felt material is provided in the bore ($1_d$) to prevent the intrusion of dirt without interfering with the passage of condensate.

Even though particular embodiments of the invention have been illustrated and described herein, it is not intended to limit the invention and changes and modifications may be made therein within the scope of the following claims.

What is claimed is:

1. Bearing assembly for a cooling water pump for motor vehicles, comprising a shaft and an impeller mounted on one end of the shaft, an outer bearing ring surrounding the shaft, an axial face seal mounted on one projecting end of the shaft having a rotating part attached to the shaft operable to tension spring-loaded sliding rings with a predetermined contact pressure against each other, characterized in that the axial face seal is pressed on said one end of the shaft so that the outer axial end face of said seal is coplanar with the axial end face of the shaft whereby the projection of the shaft (1) on the pump impeller side has the length of the axial face seal under its operating pretension and also has an axial bore (4) within which the shaft journal (5) carrying the pump impeller (6) is pressed.

2. Bearing design according to claim 1, characterized in that the shaft journal (5) is bonded with an adhesive in the axial bore (4) of the shaft (1).

3. Bearing design according to claim 1, characterized in that the shaft journal (5) and the axial bore (4) of the shaft (1) are provided with intermeshing toothing in their profiles.

4. Bearing assembly for a cooling water pump for motor vehicles, comprising a shaft and an impeller mounted on one end of the shaft, an outer bearing ring surrounding the shaft, an axial face seal mounted on one projecting end of the shaft having a rotating part attached to the shaft operable to tension spring-loaded sliding rings with a predetermined contact pressure against each other, characterized in that the axial face seal is pressed on said one end of the shaft so that it is coplanar with the axial end face of the shaft whereby the projection of the shaft (1) on the pump impeller side has the length of the axial face seal under its operating pretension and also has an axial bore (4) within which the shaft journal (5) carrying the pump impeller (6) is pressed, means defining at least one radial opening (14) in the wall shaft adjacent the sliding rings (10) of the face seal.

5. Bearing assembly for a cooling water pump for motor vehicles, comprising a shaft and an impeller mounted on one end of the shaft, an outer bearing ring surrounding the shaft, an axial face seal mounted on one projecting end of the shaft having a rotating part attached to the shaft operable to tension spring-loaded sliding rings with a predetermined contact pressure against each other, characterized in that the axial face seal is pressed on said one end of the shaft so that it is coplanar with the axial end face of the shaft whereby the projection of the shaft (1) on the pump impeller side has the length of the axial face seal under its operating pretension and also has an axial bore (4) within which the shaft journal (5) carrying the pump impeller (6) is pressed, means defining at least one radial opening (14) in the wall of the shaft adjacent the sliding rings (10) of the face seal, a plug (17) of fluid absorbent material in the bore of the hollow shaft.

* * * * *